United States Patent
Morgan

(10) Patent No.: US 11,196,819 B2
(45) Date of Patent: *Dec. 7, 2021

(54) SYSTEM AND METHOD FOR SESSION RESTORATION AFTER NODE FAILURE

(71) Applicant: ServiceNow, Inc., Santa Clara, CA (US)

(72) Inventor: Floyd Morgan, Carlsbad, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/581,032

(22) Filed: Sep. 24, 2019

(65) Prior Publication Data

US 2020/0092381 A1    Mar. 19, 2020

Related U.S. Application Data

(63) Continuation of application No. 15/484,885, filed on Apr. 11, 2017, now Pat. No. 10,447,787.

(60) Provisional application No. 62/325,787, filed on Apr. 21, 2016.

(51) Int. Cl.
   *H04L 29/08* (2006.01)

(52) U.S. Cl.
   CPC ............ *H04L 67/142* (2013.01); *H04L 67/02* (2013.01); *H04L 67/1002* (2013.01); *H04L 67/1027* (2013.01); *H04L 67/141* (2013.01)

(58) Field of Classification Search
   CPC ............... H04L 67/1027; H04L 67/142; H04L 67/1002; H04L 67/02; H04L 67/141
   See application file for complete search history.

(56) References Cited

U.S. PATENT DOCUMENTS

| | | | |
|---|---|---|---|
| 7,020,706 B2 | 3/2006 | Cates |
| 7,543,069 B2 | 6/2009 | Hasti et al. |
| 7,716,353 B2 | 5/2010 | Golovinsky |
| 7,925,981 B2 | 4/2011 | Pourheidar |
| 7,953,861 B2 | 5/2011 | Yardley |
| 8,402,127 B2 | 3/2013 | Solin |

(Continued)

OTHER PUBLICATIONS

Serverfault, "How is Session Stickiness Achieved Across Multiple Web Servers?", Date Unknown, downloaded Mar. 31, 2017, http://serverfault.com/questions/32421/how-is-session-stickiness-achieved-across-multiple-webservers, 3 pp.

*Primary Examiner* — Shean Tokuta
*Assistant Examiner* — Juan C Turriate Gastulo
(74) *Attorney, Agent, or Firm* — Fletcher Yoder PC

(57) ABSTRACT

A system and method for restoring a session state of a client device has been provided. The system comprises a memory with instructions executable by a processor to receive a first request from the client device, where the first request is a first type of request and is associated with a new session of the client device; process the first request without persisting a session state of the new session in the database node; receive a second request from the client device, where the second request is a first instance of a second type of request and is associated with the new session; and in response to determining to restore a persisted session state, restore the persisted session state for the client device from the database node, and assign the persisted session state as the session state of the new session of the client device.

20 Claims, 5 Drawing Sheets

(56) References Cited

U.S. PATENT DOCUMENTS

| | | |
|---|---|---|
| 8,612,408 B2 | 12/2013 | Trinon |
| 8,832,652 B2 | 9/2014 | Mueller |
| 9,098,322 B2 | 8/2015 | Apte |
| 9,317,327 B2 | 4/2016 | Apte |
| 9,363,252 B2 | 6/2016 | Mueller |
| 9,645,833 B2 | 4/2017 | Mueller |
| 9,654,473 B2 | 5/2017 | Miller |
| 9,766,935 B2 | 9/2017 | Kelkar |
| 9,805,322 B2 | 10/2017 | Kelkar |
| 10,382,576 B2 * | 8/2019 | Austruy ............... G06F 9/45558 |
| 2003/0014480 A1 * | 1/2003 | Pullara ................ H04L 67/1031 |
| | | 709/203 |
| 2003/0018887 A1 * | 1/2003 | Fishman ................ H04L 29/06 |
| | | 713/151 |
| 2008/0040484 A1 | 2/2008 | Yardley |
| 2008/0082647 A1 * | 4/2008 | Baker ................ H04L 67/1008 |
| | | 709/223 |
| 2010/0064168 A1 * | 3/2010 | Smoot ................ G06F 11/2069 |
| | | 714/6.12 |
| 2012/0311337 A1 | 12/2012 | Wuschek et al. |
| 2017/0212810 A1 * | 7/2017 | Hamaguchi ............. G06F 16/22 |

* cited by examiner

| CLIENT ID | SESSION STATE | LAST UPDATED TIMESTAMP | SESSION ID |
|---|---|---|---|
| 23 | 12323*ADGJC*4631 | MARCH 28, 2016 AT 12:10:02 | 567834 |
| 34 | 89893&ADJIAA*4819 | MARCH 27, 2016 AT 11:56:05 | 432167 |

SYSTEM AND METHOD FOR SESSION RESTORATION AFTER NODE FAILURE

CROSS-REFERENCE TO RELATED APPLICATION(S)

This is a continuation application of U.S. patent application Ser. No. 15/484,885, filed Apr. 11, 2017, which claims the benefit of U.S. Provisional Application No. 62/325,787, filed Apr. 21, 2016, the entire contents of which are hereby incorporated by reference in its entirety.

TECHNICAL FIELD

The present disclosure is generally related to session restoration after node failure.

BACKGROUND

A client and a web server can communicate over stateless protocols such as HTTP. Client-server interactions can be carried out over a series of related client requests and server responses. A web application can create a session for a client to maintain session state between requests. A session can start with the first request that the client makes to the server and can end when the client disconnects or the session times out. To track the state of the client-server interactions, a client can be assigned a session identifier and a session state associated with the session identifier can be maintained on the server. Session state can be application specific and include information relating to components, contexts, user interface elements, data and parameters related to a current state of a client-server interaction. The session state may also be saved to a database to enable, e.g., recovery upon server interruption.

SUMMARY

Disclosed herein are aspects of systems and methods for session restoration after application node failure.

In an implementation, a system for restoring session state of a client device is provided. The system includes database node configured to persist at least a portion of the session state, and a first application node having a processor and a memory. The memory includes instructions executable by the processor to receive a first request from the client device that is a first type of request and is associated with a new session of the client device, process the first request without persisting a session state of the new session in the database node, and receive a second request from the client device that is associated with the new session and is a first instance of a second type of request received by the first application node in the context of the new session. The memory further includes instructions to, in response to determining to restore a persisted session state, to restore the persisted session state from the database node and assign the persisted session state as the session state of the new session of the client device.

In another implementation, a method for a restoring session state in response to a category of a request received from a client device is provided. The method includes receiving, at a first application node, a first request from the client device, where the first request is a first type of request and is associated with a new session of the client device. The method further includes processing, by the first application node, the first request without persisting a session state of the new session in a database node; receiving, at the first application node, a second request from the client device, where the second request is a first instance of a second type of request and is associated with the new session, restoring, by the first application node, a persisted session state from the database node, and assigning, by the first application node, the persisted session state as the session state of the new session of the client device.

In another implementation, a non-transitory computer-readable storage medium is provided. The non-transitory computer-readable storage medium includes executable instructions that, when executed by a processor, facilitates performance of operations for restoring a session state in response to a category of a request received from a client device. The instructions include receiving, at a first application node, a first request from the client device that is a first type of request and is associated with a new session of the client device. The instructions further include processing, by the first application node, the first request without persisting a session state of the new session in a database node; receiving, at the first application node, a second request from the client device that is a first instance of a second type of request and is associated with the new session, and in response to determining to restore a persisted session state, restoring, by the first application node, the persisted session state from the database node, and assigning, by the first application node, the persisted session state as the session state of the new session of the client device.

These and other aspects of this disclosure are disclosed in the following detailed description, the appended claims, and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
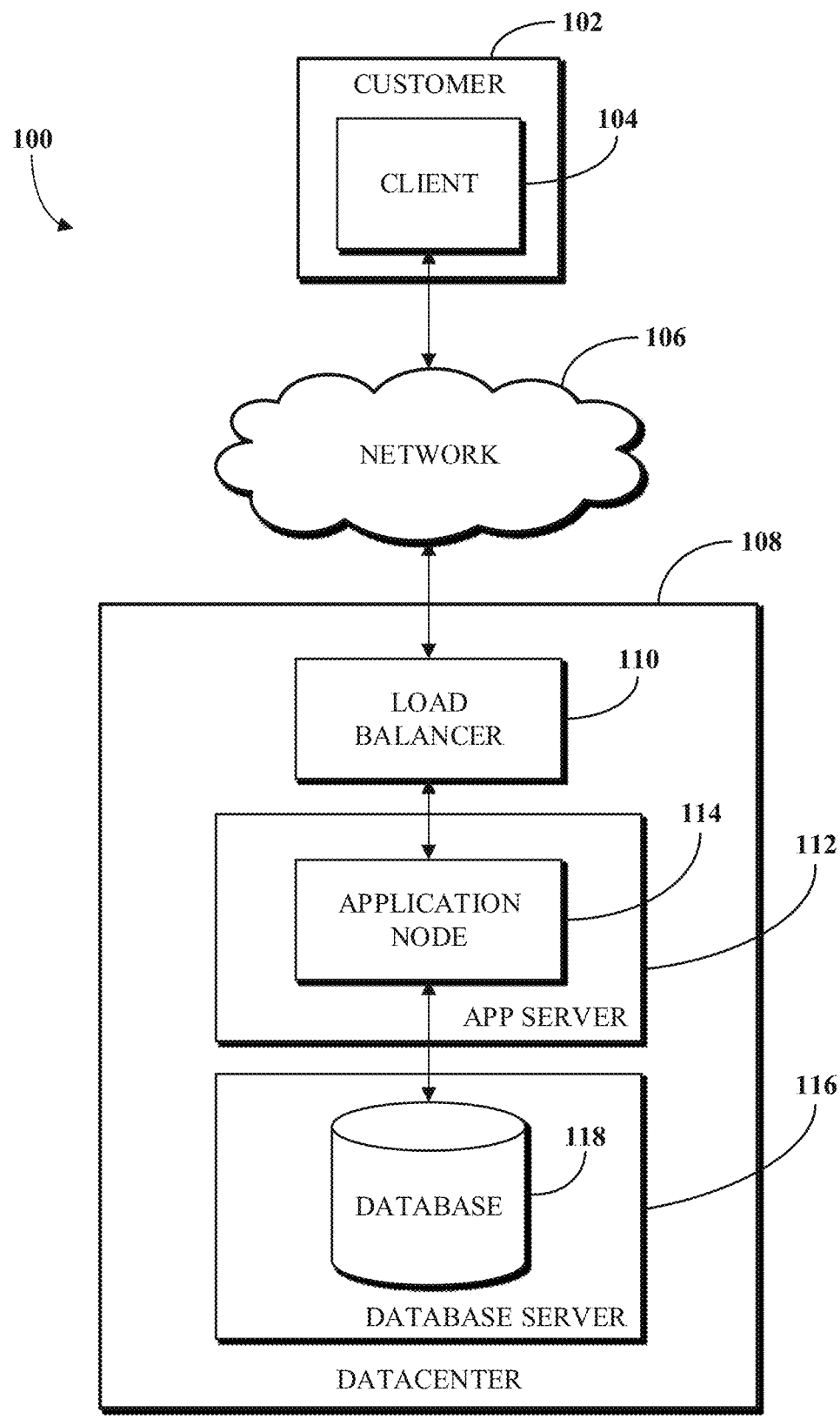
FIG. 1 is a block diagram of an example of an electronic computing and communications system.

A client and/or application node(s) can be configured such that the client can send stateful and stateless requests in the same session. A session is a series of request-responses between a requester, such as a client, and a receiver, such as a server. A stateful request can be of a type that is intended to use and/or update the session state of a session. A stateless request can be of a type that is not intended to use and/or update the session state. For example, an API request, such as one using a representational state transfer (REST) protocol can be considered a stateless request and a UI request, such as one triggered by a user, can be considered a stateful request.

After receiving a request from a client, an application node can create a session for the client. The session can include a session id that identifies the session and a session state that includes information relating to the session. The session state can be referred to during the processing of future requests from the client. The session id can be maintained by the client in a cookie or other storage mechanism (such as, for example, HTML5 storage). The application node can maintain the session id and session state in memory for the duration of the session. To permit failover in the event of an application node failure, the application node can persist the session state in a permanent store, such as a database operating on a database node. The client can be associated with the persisted session state such as by maintaining a reference to the persisted session state in a cookie or other storage mechanism. The application node can persist and/or update the session state in response to stateful requests and not in response to stateless requests. The application node can be configured to not restore the session state in response to a stateless request.

Thus, in the disclosed implementations, a client can send a request to a first application node, the first application node can create and maintain a session for that client, and the first application node can persist the session for that client. The client can maintain the session id associated with the session and a reference to the persisted session. The client can make additional requests to the first application node with the session id so that the first application node can respond to such requests using the maintained session state. After a failure of the first application node, requests from the client node may be redirected, such as by a load balancer, to a second application node or any other of a plurality of application nodes. Alternatively, requests from the client node may be directed to the first application node after waiting for a predetermined time period to enable the first application node to recover from the failure or once the first application node has been detected to have recovered from the failure. After failure, the first application node no longer has the session state maintained.

In an implementation where stateless and stateful requests are treated differently, the process of restoration of session state can be adjusted to take into account the type of request. For example, if a first request received by an application node after a failure is a stateful request, the application node can be configured to create a new session and restore the session state from the prior session (that occurred before the failure) to the new session using the reference to the previously persisted session maintained by the client. The new session and corresponding newly restored session state can then be persisted using the database node. The client can then be provided with the session id for the new session and an updated reference to a newly persisted session state.

A problem arises when a first request received by an application node after a failure is a stateless request. Restoring the session state after receiving the first request that is a stateless request from the client may lead to inconsistent results. If a session state for stateless requests is not maintained and/or persisted, a restored session state may become unavailable to later requests or a later restoration of session state may result in an inconsistent session state.

For further clarification on the problem, consider the following example where a user fills an online form through a web browser. The online form is comprised of four different steps and the user proceeds through the steps by pressing a "next" button. When the user presses "next," the input data of the user is transported to a server and saved in a session state for the user. At the same time that the user fills out the online form, the user's web browser issues background stateless messages to the server. The server fails before the user presses the "next" button associated and the user's web browser issues a background stateless request before the third step is submitted as well. A load balancer then detects the server failure and forwards the browser's background request to a second server. This being the first request received by the second server, a component of the second server may, even though not necessary as the request is a stateless request and a stateless request by definition does not use and/or maintain a session state, create a second session state for the user. When the user presses "next" after completing the third step, the second server receives the request. As the second session state is already associated with the user, the second server uses the second session state in the processing of the data associated with the third step. However, this results in data loss as the input data from the first two steps are no longer part of the user's second session state.

To address such a problem, the present disclosure includes an application node that can include a session restoration system which categorizes requests received from a client to determine when a first stateful request is received from a client. As such, the client's session state is restored only after receiving the first stateful request even if one or more prior requests were stateless requests and thus created a new session on the application node. Such a session restoration system can be configured so that the session state is not restored after receiving the one or more prior stateless requests. As such, a session state can be maintained for a client's stateful requests after a failure while avoiding the inconsistencies or errors that are caused by restoring sessions states after receiving interspersed stateless requests.

Implementations of the present disclosure provide technological improvements particularly to computer networks, for example, those concerning client session restoration. Computer network-specific technological problems, such as loss of session state information, can be wholly or partially solved by implementations of the present disclosure. For example, the present disclosure enables the proper restoration of a session state after a new session is established based on a received stateless request. Implementations of the present disclosure can thus introduce new and efficient improvements in the ways in which a client session state is restored by categorizing requests into stateful and stateless and only restoring the session state once a stateful request is received thereby ignoring potential restoration when only stateless requests are received.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116.

In some implementations, the application server 112 includes an application node 114, which can be a process executed on the application server 112. For example, and without limitation, the application node 114 can be executed in order to deliver services to a client, such as the client 104, as part of web application software. The application node 114 can be implemented using processing threads, virtual machine instantiations, or other computing features of the application server 112. In some implementations, the application node 114 can store, evaluate, or retrieve data from a database, such as the database 118 of the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as a database 118, which can be accessible by software executed on the application node 114. The database 118 may be implemented as a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the database 118), tables, other suitable information sources, or portions or combinations thereof may be stored, managed, or otherwise provided by one or more of the elements of the system 100 other than the database server 116, such as the client 104 or the application server 112.

Some or all of the systems and techniques described herein can operate or be executed on or by the servers associated with the system 100. For example, restoring a session state of a client device can be implemented by application node 114. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
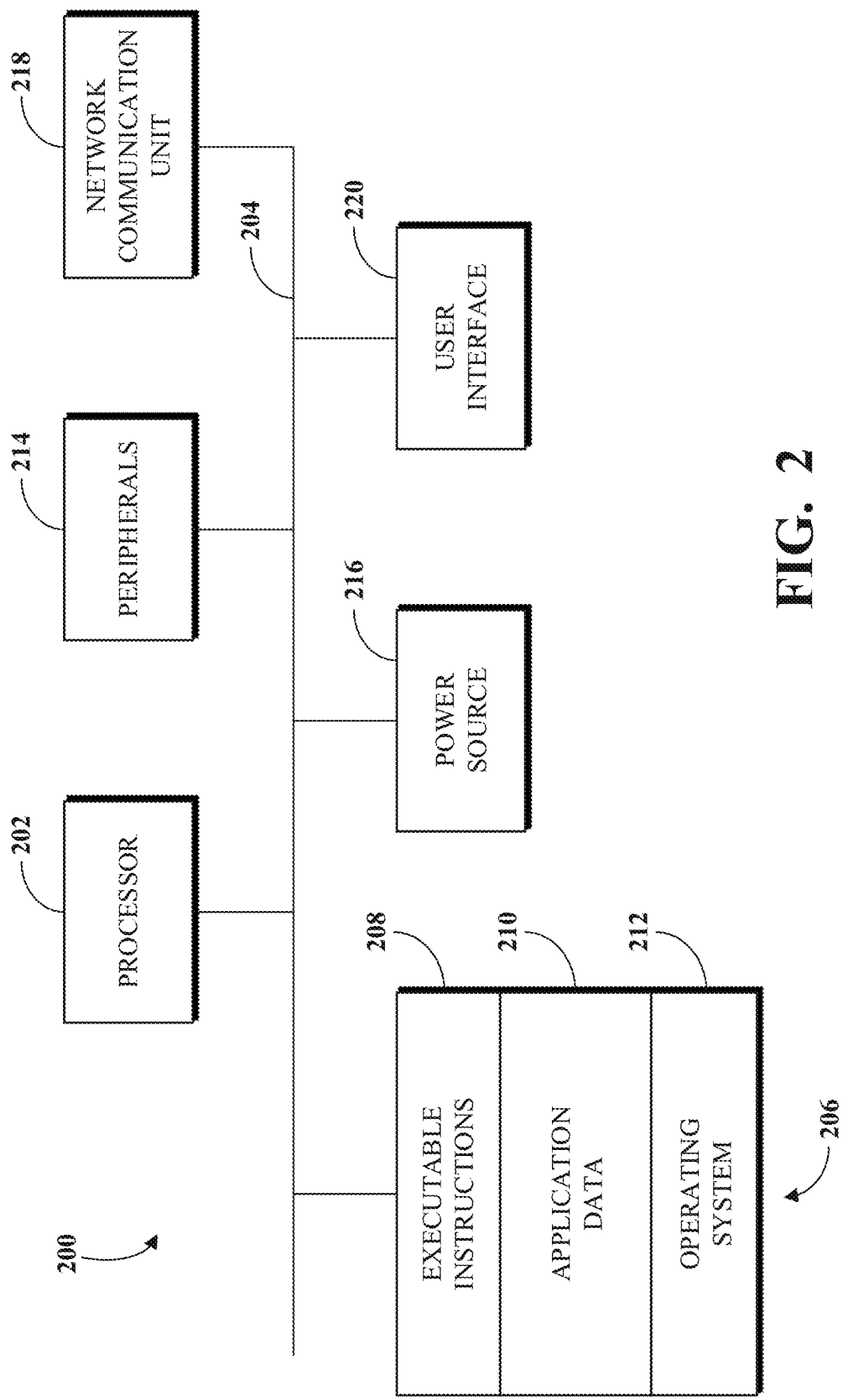
FIG. 2 is a block diagram of an example internal configuration of a computing device of an electronic computing and communications system.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to restore session state of a client device.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figures 3, 4:
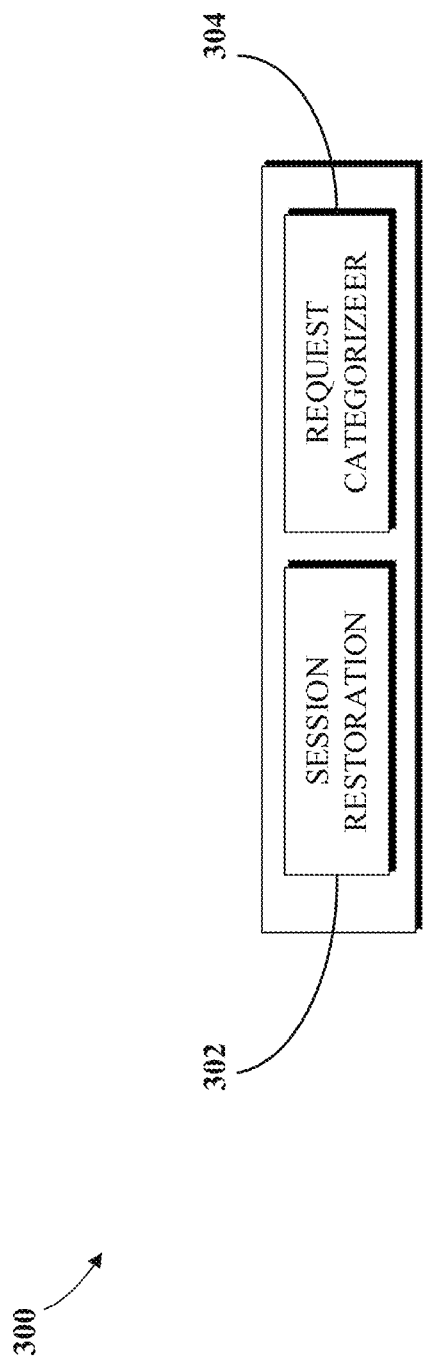
FIG. 3 is a block diagram of an example of a session restoration system.
FIG. 4 is an example of a data structure usable for session restoration.

FIG. 3 is a block diagram of an example of a session restoration system 300 for session restoration. The session restoration system 300 can be implemented by a computing device, such as the computing device 200 of FIG. 2. The session restoration system 300 can be implemented by an application node, such as the application node 114 of FIG.

1. The session restoration system 300 includes a session restoration module 302 and a request categorizer module 304.

The session restoration module 302 can update a session state of a client, such as client 104 of FIG. 1 and a session state in a database, such as database 118 of FIG. 1. The session restoration system 300 can restore the client's session state from the database. The session restoration module 302 can update and restore a session state in accordance with the sample steps/operations provided below in FIG. 5.

The request categorizer module 304 can determine a category of a client request. For example, the request categorizer module 304 can determine a request is a stateful request or a stateless request. The request categorizer module 304 can examine the request to determine if its characteristics match that of a stateful request or a stateless request. The request categorizer module 304 can determine that a request is a stateless request if the request is, for example, an API request such as a SOAP or REST request. The request categorizer module 304 can determine that a request is stateless when any of the following occur including but not limited to determining that a request is automatically submitted without user intervention or interaction, based on a lookup against known characteristics, based on a parameter of the request, based on stored information, and a combination thereof. A request automatically submitted without user intervention or interaction can be a request submitted by a script executing in a web browser of a client device, such as the client 104 of FIG. 1. The script can, for example, automatically submit AJAX requests to an application node. The request categorizer module 304 can store, for later retrieval, the determined category of a client request.

In an implementation, the session restoration module 302, the request categorizer module 304, or both may be implemented outside the application node 114 of FIG. 1 and provide a session transfer service to the application node 114 of FIG. 1.

FIG. 4 is an example of a data structure 400 usable for session restoration. Implementations of the data structure 400 can be used, for example, to maintain a session state on an application node or to persist a session state in a permanent store such as the database 118 of FIG. 1. The data structure 400 can include records such as entry 410 which can include information about the session state of a particular client. Specifically, the entry 410 includes a client identification number (ID) 402, a session state 404, a last updated timestamp 406, and a session ID 408. The client ID 402 is a unique identifier of a client device, such as the client 104 of FIG. 1. The client ID 402 can include but is not limited to an IP address, a MAC address, and/or an identifier stored by a client in a cookie or other storage mechanism.

The session state 404 can be configured to store at least a subset of a session state maintained by an application node, such as the application node 114 of FIG. 1. The session state 404 can be configured to permit data to be saved in any number of formats including, without limitation, a string, an XML blob, name-value pairs, a serialized object, and an encoded string.

The last updated timestamp 406 indicates when the information for a record was, for example, created or last updated. In another embodiment, the data structure 400 includes both a created timestamp that denotes when the record was created and a last updated timestamp that denotes when the record was last updated (if at all). The value of the last updated timestamp 406 can be, for example, automatically set by the permanent store system or by the session restoration system 300. The session ID 408 can be the session ID of a session that is persisted in the data structure 400. The session ID 408 can be generated by, for example, an application node when a first request from a client is received by the application node. Alternatively, the session ID 408 can be assigned by another device or module, such as a load balancer.

The data structure 400 can have different data elements than those shown in FIG. 4. The data structure 400 can have additional data elements, omit data elements, or modify data elements 402-408. For example, a single data element for identification may be used instead of using separate data elements as the client ID 402 and the session ID 408. In this example, either the client ID 402 or the session ID 408 can be omitted.

Figure 5:
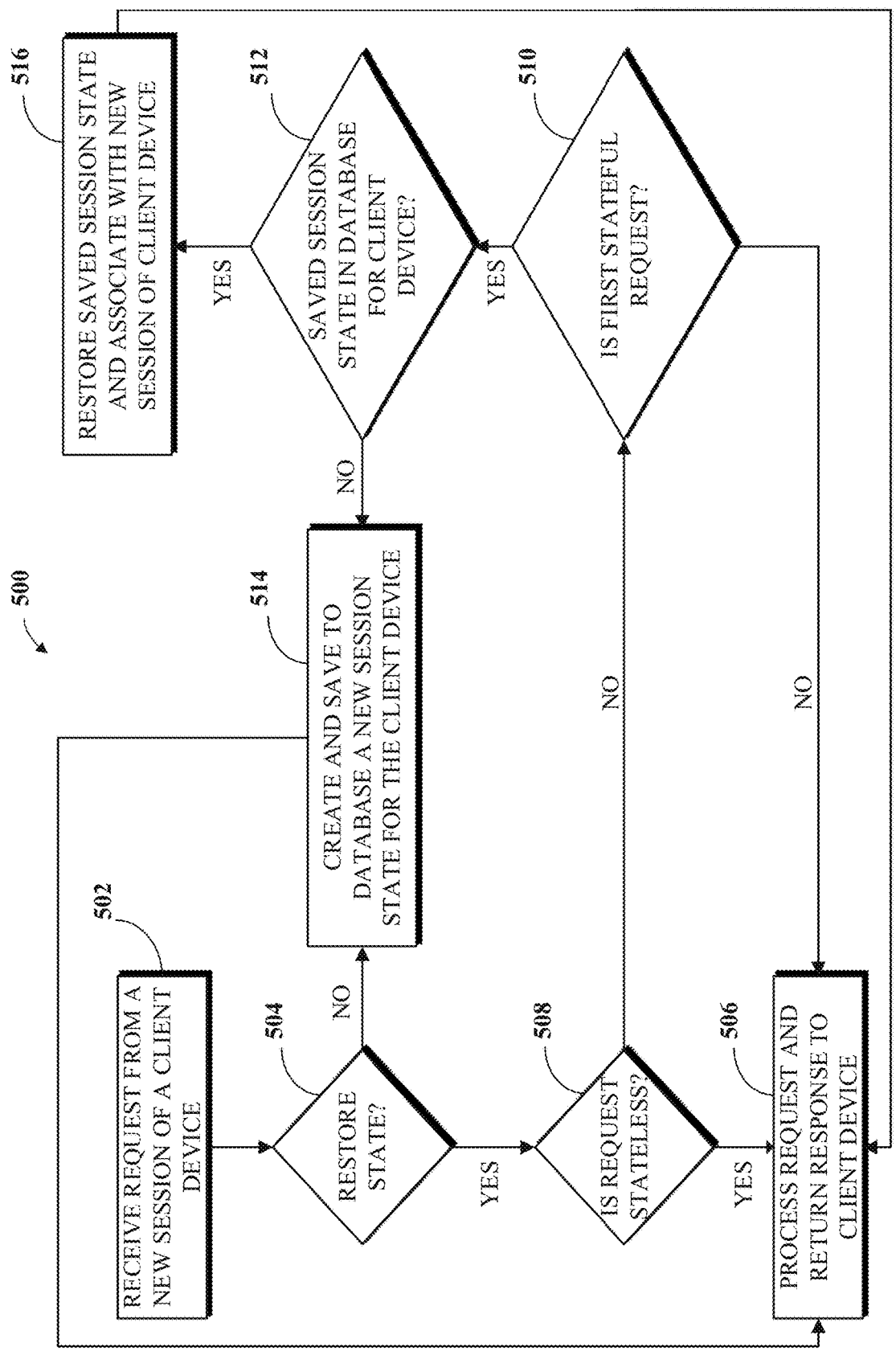
FIG. 5 is a flowchart illustrating an example of a technique for session restoration.

FIG. 5 is a flowchart illustrating an example of a technique 500 for session restoration. The technique 500 is implemented by a session restoration module (similar to the session restoration module 302 of FIG. 3). The technique 500 can be executed using computing devices, such as the systems, modules, and devices described with respect to FIGS. 1-4. The technique 500 can be performed, for example, by executing a machine-readable program or other computer-executable instructions, such as instructions or programs described according to JavaScript, C, or other such instructions. The steps, or operations, of the technique 500 or any other technique, method, process, or algorithm described in connection with the implementations disclosed herein can be implemented directly in hardware, firmware, software executed by hardware, circuitry, or a combination thereof.

At operation 502, the application node 114 of FIG. 1 receives a first request from the client 104 of FIG. 1. A new session is generated in response to the request. The new session can include a new session ID and a persisted session state (similar to the session ID 408 and the session state 404 of FIG. 4). The new session may be generated by an application node, such as the application node 114 of FIG. 1 depending on the implementation. At operation 504, a session restoration module determines whether a persisted session state associated with the client 104 should be restored from the data structure 400. The session restoration module may determine that the persisted session state should not be restored because, for example, the new session (i.e. the time of creation of the new session) was not initiated sufficiently proximate in time to a last updated time (similar to the last updated time 406 of FIG. 4) of the persisted session state. In an implementation, the session restoration module determines whether a persisted session state is associated with a user of the client 104.

In an implementation, sufficient proximity in time can be satisfied if the time difference between the last updated time and the time that the first request is received from the client does not substantially exceed a predetermined or dynamically set threshold value. In another embodiment, the sufficient proximity in time is only satisfied if the time difference is below the threshold value. For example, the threshold value may be set to the user session timeout value configured for an application node, such as the application node 114 of FIG. 1. If the user session timeout value is set to 20 minutes, then the persisted session state should be restored if the time difference does not substantially exceed 20 minutes. Other configurations of the time difference are also available. For example, the threshold value can range from milliseconds to a few minutes. If the session restoration module determines that the persisted session state should not be restored, then control passes to operation 514 which is further described below.

If the session restoration module determines that the persisted session state should be restored, then control passes to operation 508. At operation 508, a request categorizer (similar to the request categorizer module 304 of FIG. 3) can be used to determine the category of the request. If the request is determined to be a stateless request, then at operation 506 the request is processed by the application node 114 and a response is returned to the client 104. The response details the categorization of the request and can be or include, for example, HTML content, XML content, JSON content, a redirection to another location, an error message or an error code, executable instructions, or a combination thereof. If the request is not a stateless request, then at operation 510, the session restoration module determines whether the request received is the first stateful request received from the client 104 in the new session. If it is not the first stateful request, then control passes to the operation 506 without restoring a persisted session state. The session restoration module can update session state information (similar to the session state 404 in entry 410 of FIG. 4 assuming that entry 410 is the persisted session state of the client session) to reflect session state changes maintained by the application node 114.

If the session restoration module determines, at operation 510, that the request is a first stateful request, then at operation 512, the session restoration module determines whether a data structure (similar to the data structure 400 of FIG. 4) contains a persisted session state associated with the client 104 by, for example, checking whether the data structure contains an entry where a client ID (similar to the client ID 402 of FIG. 4) is equal to the client device identifier of the client 104. If the data structure contains a persisted session state associated with the client 104, control passes to operation 516, otherwise control passes to operation 514. At operation 516, the session restoration module retrieves the persisted session state of the matched entry in the data structure (e.g., retrieving the persisted session state 404 of the matched entry 410 in the data structure 400 of FIG. 4) and associates the retrieved persisted session state with the client session identifier of the client 104. At operation 514, the session restoration module creates a new entry in the data structure for the new session. The session restoration module sets, in the new entry, a client device identifier to a uniquely identifying value of the client 104, the persisted session state (similar to the session state 404 entry), a current timestamp for the last updated time (similar to the last updated time 406 entry), and a session ID to the session identifier assigned by, e.g., the load balancer 110. Control then passes to operation 506 as the system awaits additional requests to process in accordance with the technique 500.

Figure 6:
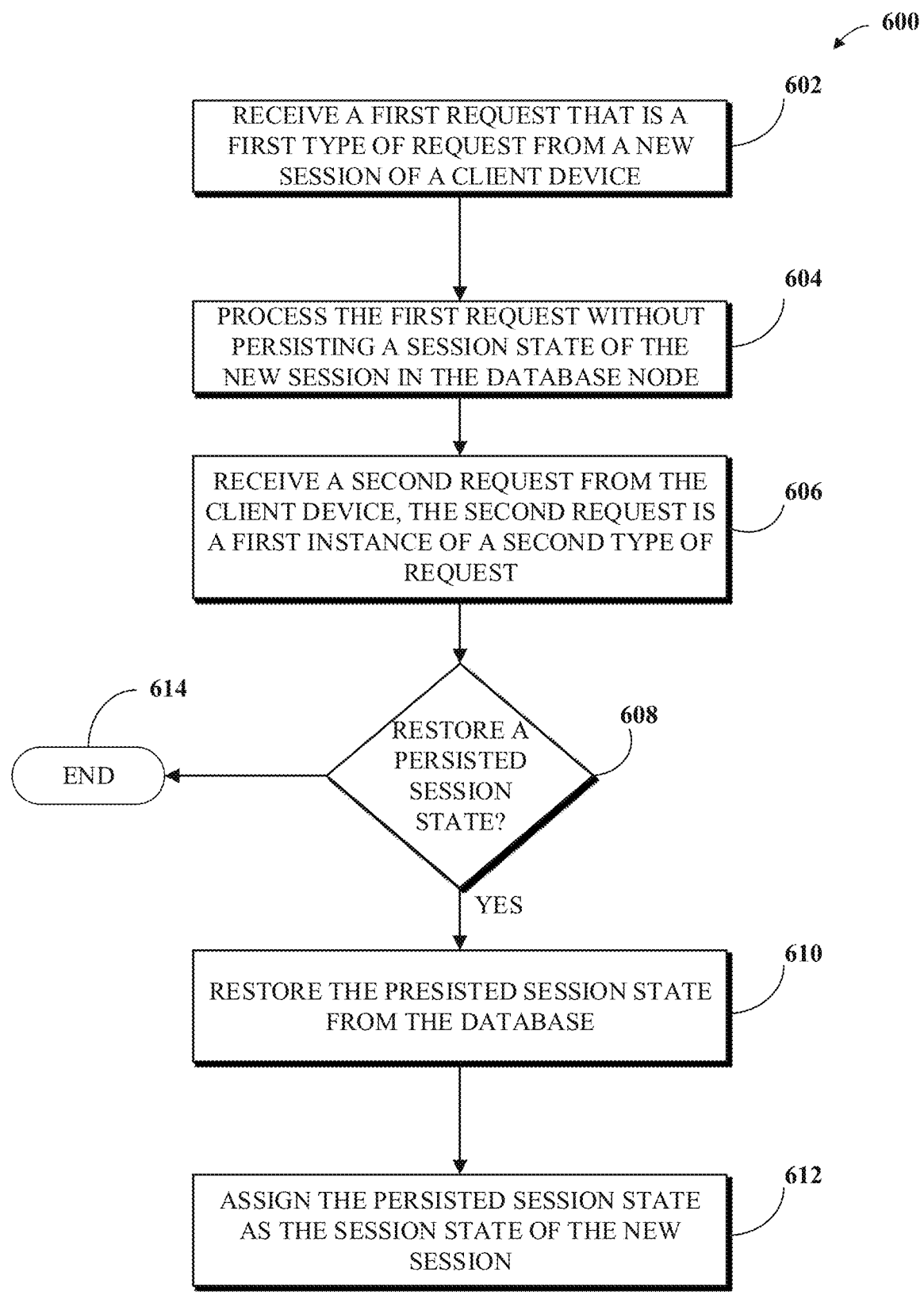
FIG. 6 is a flowchart illustrating an example of another technique for session restoration.

FIG. 6 is a flowchart illustrating an example of another technique 600 for session restoration. The technique 600 can be executed using computing devices, such as the systems, modules, and devices described with respect to FIGS. 1-4. The technique 600 can be performed, for example, by executing a machine-readable program or other computer-executable instructions, such as instructions or programs described according to JavaScript, C, or other such instructions. The steps, or operations, of the technique 600 or any other technique, method, process, or algorithm described in connection with the implementations disclosed herein can be implemented directly in hardware, firmware, software executed by hardware, circuitry, or a combination thereof.

The technique 600 can include operations 602, 604, 606, 608, 610, and 612. At operation 602, a first request that is a first type of request is received from a new session of a client device. A new session means that there is not a tracked and on-going sequence of interactions with the client device, from the point of view of the technique 600 or a system in which it executes. At operation 604, the request is processed and a response is returned to the client device.

At operation 606, a second request is received and the technique 600 determines that the second request is a first instance of a second type of request received from in the new session. A "first instance of a second type of request" means that prior requests of the second type of request were not received in the new session but prior requests of the first type of request (such as the one from operation 602) could have been received. The second request (i.e. the first instance of the second type of request) may have been preceded by one or more of the first type of requests. That is, zero or more first type, but no second type, requests may be received between the receiving of the first request (i.e. the first type of request) and the receiving of second request (i.e. the first instance of the second type of request). For example, five of the first type of requests can be received and are all referred to as the "first request" and, if the sixth received request is of the second type of request, then this sixth request is referred to as the second request (because it is the first instance of the second type of request). In an implementation, the first type of request is a stateless request that does not use and/or change a session state of the client device and the second type of request is a stateful request that does use and/or change the session state of the client device.

At operation 608, a determination is made whether to restore a persisted session state. A determination is first made whether a persisted session state associated with the client device exists, such as in a database. A session state associated with the client device may be a persisted session state associated with a user of the client device. In another embodiment, a session state associated with the client device may be a persisted session state associated with the client device itself. At operation 608, the determination whether a persisted session state is to be restored can be carried out as described above with respect to the operation 504 of FIG. 5. If it is determined that a persisted session state is not to be restored, then the technique 600 ends at operation 614.

At operation 610, if it is determined that the persisted session state is to be restored, the technique 600 restores the persisted session state for the client device from a data store, such as the data structure 400 of FIG. 4. At operation 612, the persisted session state is assigned as the session state of the new session of the client device.

In an implementation, the methods and systems disclosed herein can be implemented to transfer a client device's session from a first application node to a second application node. In response to receiving a request from client device, a load balancer, such as the load balancer 110 of FIG. 1, may determine that the first application node, assigned to the client device, is unavailable. For example, an application node can be unavailable when it experiences performance degradations, is taken offline, has unexpectedly shutdown, or any combination thereof. Other indications of unavailability are possible. When the first application node is unavailable, the load balancer can forward a client device's request to a second application node (or any other application node of a plurality of application nodes that are available). The second application node, upon receiving the client request, can perform or have performed the steps/operations of the techniques 500 and/or 600.

The methods and systems disclosed herein may be implemented in a one-node environment (e.g. an environment that may be non-clustered and non-load balanced). For example, when an application node becomes unavailable it can lose a client device's session state when the session state is maintained in the memory of the application node. The methods disclosed herein can be used to restore a client device's session state to the application node when the client device makes a first new request to the application node subsequent to the application node becoming available after a period of unavailability.

The methods and systems disclosed herein may be used to cause aspects of a user's session state, not saved to a data structure, such as the data structure 400 of FIG. 4, to be reset. For example, a session state for a user of a client, such as the client 104 of FIG. 1, may include a user preference which can be, for example, a default system preference or a user defined preference. Such a user preference can be, for example, generated by an application node, such as the application node 114 of FIG. 1, when a value for the preference is needed. A user preference can be used to influence the operation of the web application. A setting for a user preference may, for example, cause performance degradation. When such a preference is in a session state maintained by the application node's session state, but is not in a subset session state saved to the data structure, and when the user session is terminated in the application node, the user preference may be reset to a different value when the user preference is recreated upon, for example, session restoration. After the client 104's next request to the application node, the session state can be restored by a session restoration module, such as the session restoration module 302 of FIG. 3. The restored session state can omit a given preference that causes performance degradation because the persisted session state omits the given preference. Such a process may permit the removal of certain aspects of session state, while keeping more important aspects of session state using the session restoration system.

The session restoration module can restore, as a part of the session state, data such as a cross-site request forgery (CSRF) token to permit the web application to complete the processing of requests initiated with another application node. To the extent that the persisted session state does not include information needed in the restored state, such as a CSRF token, the session restoration module can be configured to inject such data into the session state during the restoration process.

Furthermore, not all illustrated steps may be required to implement a method in accordance with the disclosed subject matter. For example, the session restoration module may save to and restore from the data structure a session state for every stateful request received from the client. As another example, session restore module may not perform operation 504 of FIG. 5.

Although the techniques 500 and 600 are shown as a series of operations for clarity, implementations of the techniques 500 and 600 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

Another implementation of this disclosure is a system for restoring a session state of a client device. The system includes a means for receiving a first request from the client device that is a first type of request (e.g., a stateless request) and is associated with a new session of the client device, a means for processing the first request without persisting a session state of the new session in the database node, a means for receiving a second request from the client device that is a first instance of a second type of request (e.g., a first stateful request) and is associated with the new session, and in response determining to restore a persisted session state, a means for restoring the persisted session state from the database node, and a means for assigning the persisted session state as the session state of the new session of the client device.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
    a first server including a processor and a memory, accessible by the processor, the memory storing instructions, that when executed by the processor, cause the processor to perform operations comprising:
        receiving a request associated with a current session from a client device after a second server associated with a previous session experienced a failover condition;
        determining that the request is a first stateful request received from the client device after the second server experienced the failover condition;
        determining that a session state of the previous session was last updated within a threshold time period from a time of creation of the current session; and assigning the session state of the previous session to a session state of the current session in response to determining that the session state of the previous session was last updated within the threshold time period.

2. The system of claim 1, wherein assigning the session state of the previous session to the session state of the current session comprises restoring the session state of the previous session from the second server as the session state of the current session.

3. The system of claim 1, wherein the threshold time period comprises a period of time associated with the previous session to time out.

4. The system of claim 1, wherein the operations comprise:
receiving a second request associated with the current session from the client device after the second server associated with the previous session experienced the failover condition;
determining that the second request is a stateless request; and
processing the stateless request without assigning the session state of the previous session to the session state of the current session.

5. The system of claim 4, wherein the second request associated with the current session is received by the first server before the request associated with the current session.

6. The system of claim 1, comprising a load balancer configured to:
receive the request associated with the current session from the client device;
determine that the second server associated with the previous session experienced the failover condition; and
forward the request associated with the current session to the first server.

7. The system of claim 1, wherein the operations comprise:
receiving a second request associated with the current session from the client device after the second server associated with the previous session experienced the failover condition;
determining that the second request is a second stateful request received from the client device after the second server experienced the failover condition; and
processing the second stateful request without assigning the session state of the previous session to the session state of the current session.

8. A method, comprising:
receiving, at a first server, a request associated with a new session from a client device after a period of unavailability of a second server associated with a previous session of the client device;
determining, at the first server, that the request is a first stateful request received from the client device after the period of unavailability of the second server;
determining, at the first server, that a session state of the previous session was last updated within a threshold time period from a time of creation of the new session; and
assigning, at the first server, the session state of the previous session to a session state of the new session in response to determining that the session state of the previous session was last updated within the threshold time period.

9. The method of claim 8, wherein assigning the session state of the previous session to the session state of the new session comprises restoring, at the first server, the session state of the previous session from the second server as the session state of the new session.

10. The method of claim 8, wherein the threshold time period comprises a period of time associated with the previous session to time out.

11. The method of claim 8, comprising:
receiving, at the first server, a second request associated with the new session from the client device after the period of unavailability of the second server associated with the previous session of the client device;
determining, at the first server, that the second request is a stateless request; and
processing, at the first server, the stateless request without assigning the session state of the previous session to the session state of the new session.

12. The method of claim 11, wherein the second request associated with the new session is received by the first server before the request associated with the new session.

13. The method of claim 8, comprising:
determining, by a load balancer, that the second server is unavailable; and
forwarding, by the load balancer, the request associated with the new session to the first server.

14. The method of claim 8, comprising:
receiving, at the first server, a second request associated with the new session from the client device after the period of unavailability of the second server associated with the previous session of the client device;
determining, at the first server, that the second request is a second stateful request received from the client device after the period of unavailability of the second server; and
processing, at the first server, the second stateful request without assigning the session state of the previous session to the session state of the new session.

15. A non-transitory, computer-readable medium, comprising instructions that when executed by one or more processors, cause the one or more processors to perform operations comprising:
receiving a request associated with a new session from a client device after a period of unavailability of a first server associated with a previous session of the client device;
determining that the request is a first stateful request received from the client device after the period of unavailability of the first server;
determining that a session state of the previous session was last updated within a threshold time period from a time of creation of the new session; and
assigning the session state of the previous session to a session state of the new session.

16. The non-transitory, computer-readable medium of claim 15, wherein assigning the session state of the previous session to the session state of the new session comprises restoring the session state of the previous session from the first server as the session state of the new session.

17. The non-transitory, computer-readable medium of claim 15, wherein the threshold time period comprises a period of time associated with the previous session to time out.

18. The non-transitory, computer-readable medium of claim 15, wherein the operations comprise:
receiving a second request associated with the new session from the client device after the period of unavailability of the first server associated with the previous session of the client device;

determining that the second request is a stateless request; and processing the stateless request without assigning the session state of the previous session to the session state of the new session.

19. The non-transitory, computer-readable medium of claim 18, wherein the second request associated with the new session is received before the request associated with the new session.

20. The non-transitory, computer-readable medium of claim 15, wherein the instructions comprise:

receiving a second request associated with the new session from the client device after the period of unavailability of the first server associated with the previous session of the client device;

determining that the second request is a second stateful request received from the client device after the period of unavailability of the first server; and processing the second stateful request without assigning the session state of the previous session to the session state of the new session.

\* \* \* \* \*